(12) United States Patent
Petersen et al.

(10) Patent No.: US 12,267,258 B1
(45) Date of Patent: Apr. 1, 2025

(54) CUT-THROUGH DATA FORWARDING WITH EARLY INGRESS PROCESSING

(71) Applicant: Ethernovia Inc., San Jose, CA (US)

(72) Inventors: Brian Arnold Petersen, San Francisco, CA (US); Tom Quoc Wellbaum, San Jose, CA (US); Poon-Kuen Leung, Fremont, CA (US)

(73) Assignee: Ethernovia Inc., San Jose, CA (US)

( * ) Notice: Subject to any disclaimer, the term of this patent is extended or adjusted under 35 U.S.C. 154(b) by 213 days.

(21) Appl. No.: 18/064,015

(22) Filed: Dec. 9, 2022

Related U.S. Application Data

(60) Provisional application No. 63/265,662, filed on Dec. 17, 2021.

(51) Int. Cl.
*H04L 49/90* (2022.01)
*H04L 1/00* (2006.01)
*H04L 49/901* (2022.01)

(52) U.S. Cl.
CPC ........ *H04L 49/9026* (2013.01); *H04L 1/0041* (2013.01); *H04L 49/901* (2013.01)

(58) Field of Classification Search
CPC .. H04L 1/0041; H04L 49/901; H04L 49/9026
See application file for complete search history.

(56) References Cited

U.S. PATENT DOCUMENTS

| | | | | |
|---|---|---|---|---|
| 6,202,105 B1 * | 3/2001 | Gates | .................... | G06F 13/385 710/21 |
| 7,814,218 B1 * | 10/2010 | Knee | ....................... | H04L 69/18 709/230 |
| 7,889,749 B1 * | 2/2011 | Olson | .................... | G06F 13/126 709/234 |
| 10,742,558 B1 * | 8/2020 | Matthews | ............... | H04L 12/56 |
| 11,818,236 B1 * | 11/2023 | Petersen | ............. | H04L 49/3027 |
| 2004/0120333 A1 * | 6/2004 | Geddes | ................... | H04L 49/90 370/465 |
| 2004/0151191 A1 * | 8/2004 | Wu | ........................... | H04L 9/40 709/236 |
| 2006/0015672 A1 * | 1/2006 | Boily | .................. | G06F 13/4059 710/52 |
| 2007/0143522 A1 * | 6/2007 | Wilkinson | ............... | G06F 13/28 710/310 |
| 2012/0057597 A1 * | 3/2012 | Oskouy | ............... | H04L 47/6225 370/392 |
| 2015/0373167 A1 * | 12/2015 | Murashov | ............. | H04L 69/321 370/392 |
| 2018/0089114 A1 * | 3/2018 | Hanscom | ............ | G06F 13/1673 |
| 2021/0058343 A1 * | 2/2021 | Greth | .................. | H04L 49/9021 |
| 2023/0308400 A1 * | 9/2023 | Fons Lluis | ............. | H04L 45/52 |

* cited by examiner

*Primary Examiner* — Wutchung Chu
(74) *Attorney, Agent, or Firm* — Schwegman Lundberg & Woessner, P.A.

(57) ABSTRACT

Various embodiments provide for cut-through data unit forwarding with early ingress processing of a data unit in a communications network, such as an Ethernet-based network. According to some embodiments, cut-through data unit forwarding is performed such that data unit processing is initiated by a receiving network device while the data unit is still underway from a transmitting network device.

20 Claims, 6 Drawing Sheets

CUT-THROUGH DATA FORWARDING WITH EARLY INGRESS PROCESSING

CROSS-REFERENCE TO RELATED APPLICATION

This application claims priority to and the benefit of U.S. Provisional Patent Application No. 63/265,662, filed on Dec. 17, 2021, which is incorporated herein by reference.

TECHNICAL FIELD

Embodiments described herein relate to data communications and, more particularly, to systems, methods, devices, and instructions relating to cut-through data forwarding with early ingress processing of a data unit.

BACKGROUND

Communications networks allow for the exchange of data between various interconnected network devices. Data transmitted from one network device to another is a broken into smaller data units (e.g., data packet, data frames), which are each transmitted separately along a network path, over a data link, to their network destination. Each data unit can, for example, comprise an ordered set of individual values, such as a binary number made up of an ordered set of zeroes and ones (e.g., 0001, 0010, etc.) or contiguous groups of eight binary digits (bytes). The data units can be generated using various communication protocols or standards (e.g., Ethernet, Internet Protocol, (IP), User Datagram Protocol (UDP)) that define the rules, syntax and semantics for arranging a data unit. For example, a communication protocol may define a length of the data unit (e.g., number of individual values (bytes)), as well as identify the types of data that are to be stored in the various positions of the data unit, such as identifying the range of bytes (e.g., bytes 0-127) that store header data (e.g., one or more headers), transferred data (e.g., payload), or trailer.

A header can comprise data used to deliver a data unit to its intended network destination, where such data can include data identifying the data unit type (e.g., the communication protocol used to generate the data unit), a source network address, a destination network address, and the like. Multiple communication protocols can be used to transmit data through use of data encapsulation. Encapsulation is a method in which a data unit generated using one communication protocol is stored as the payload of a data unit generated using a different communication protocol or another instance of the same protocol. The header type of the outermost header defines the data unit type of the data unit. In some cases, a data unit may be encapsulated multiple times resulting in a data unit that is encapsulated in multiple layers of headers.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
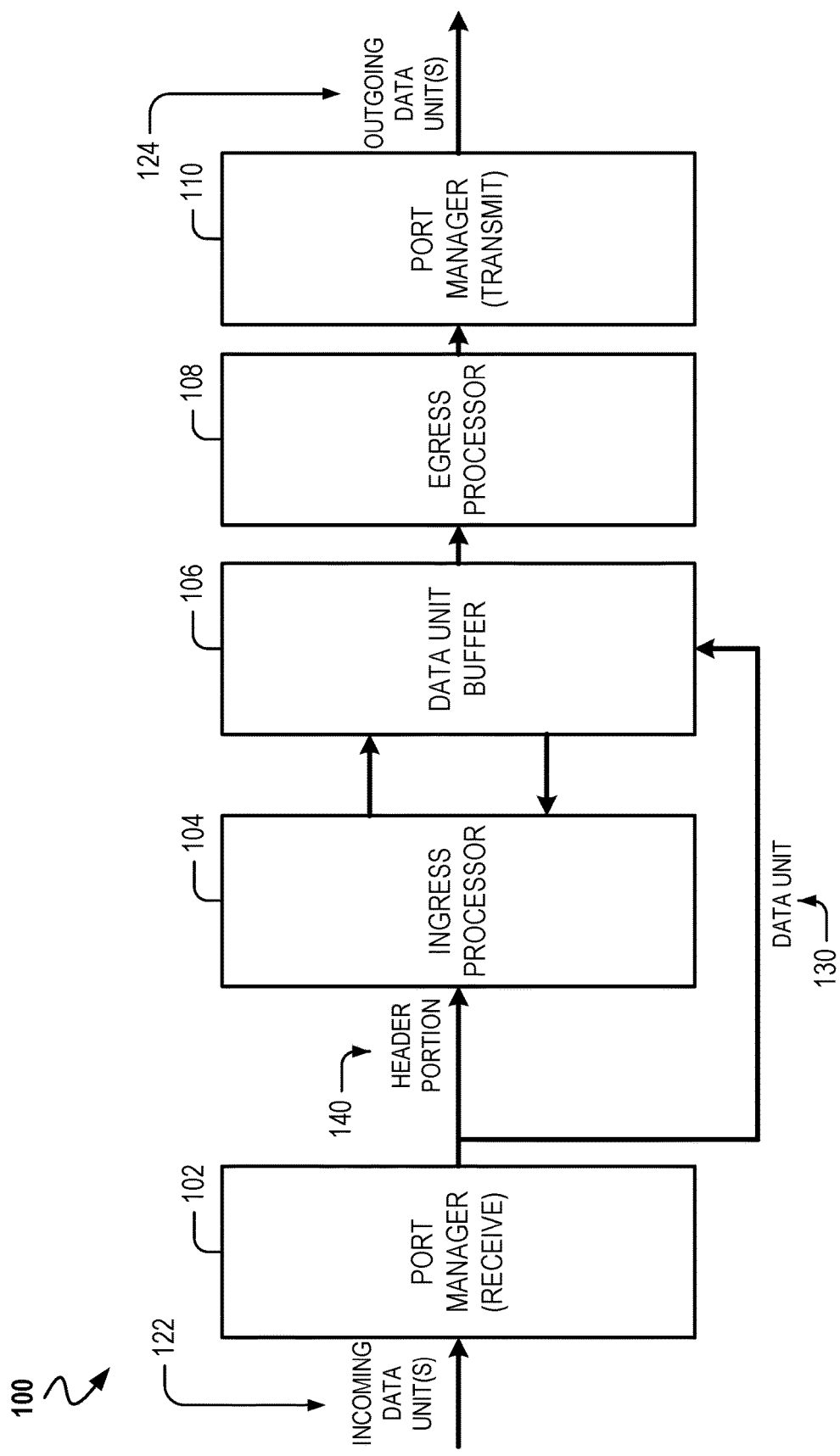
FIG. 1 is a block diagram illustrating an example data unit forwarding system that supports cut-through forwarding with early ingress processing of a data unit, in accordance with some embodiments.

Certain devices in a communications network, such as bridges, routers, switches, implement a data unit forwarding system that forwards a received data unit, such as a data packet (or packet), to another network device.

Generally, a data unit forwarding system receives a data unit, examines one or more headers of the received data unit, and transmits the received data unit via an appropriate set of transmit ports (e.g., output network ports) based on the examination. Under a conventional store-and-forward methodology of data unit forwarding (e.g., hereafter referred to as store-and-forward forwarding), the data unit forwarding system stores (i.e., fully receives) a data unit before the data unit is forwarded. This means that with store-and-forward forwarding, a data unit can be delayed by at least the time-duration of receiving the data unit, where the time-duration is the product of the data unit's length (e.g., in bits) and data link's data rate (e.g., in bits per second). This also means that for long data units or data links with lower data rates (e.g., lower bit rates), the storage-related delays of a store-and-forward forwarding can significantly or adversely impact end-to-end forwarding latency in the communications network. An additional contributor to latency by store-and-forward forwarding is data unit processing. For instance, parsing, lookup, path determination, header rewrite, and other operations that facilitate store-and-forward data unit forwarding take a certain amount of time to perform.

Under a conventional cut-through methodology of data unit forwarding (e.g., hereafter referred to as cut-through forwarding), the data unit forwarding system initiates data unit processing at the start of data unit reception (instead of at the end of data unit reception like conventional store-and-forward forwarding), and initiates transmission of the data unit as soon as the data unit processing is complete. While conventional cut-through forwarding can address latency issues caused by conventional store-and-forward forwarding, conventional cut-through forwarding can cause an error to propagate across a communication network when the conventional cut-through forwarding causes the data unit forwarding system to forward a data unit with an error (e.g., a cyclic redundancy check (CRC) error). Additionally, receiving a data unit with an error can cause conventional cut-through forwarding to transmit the received data unit via an incorrect transmit port if the error is present in addressing information in one or more headers of the received data unit (e.g., header is corrupted and leads to a reception error).

Various embodiments described herein address these and other deficiencies of conventional technologies. In particular, various embodiments described herein provide for cut-through data unit forwarding with early ingress processing of a data unit (e.g., packet or data frame) in a communications network, such as an Ethernet-based network. According to some embodiments, cut-through data unit forwarding is performed such that data unit processing (e.g., ingress data unit processing, such as header processing) is initiated as soon as a sufficient number of header bytes have been received, and transmission (e.g., forwarding or egress processing) of the data unit is not initiated until the data unit has been fully received and its correctness (e.g., based on header processing) has been verified. For some embodiments, data unit processing (e.g., ingress data unit processing, such as header processing of data from a header portion of a data unit) is initiated by a receiving network device (e.g., receiving physical layer device) while the data unit (e.g., the non-header portion of the data unit, such as the payload) is still underway (e.g., still being received) from a transmitting network device (e.g., transmitting physical layer device). For example, the earliest that data unit processing can be initiated is the point at which a header byte string of a data unit has been received from a transmitting network device. For a short data unit, the header byte string can represent the entire data unit and cut-through forwarding may have no latency-reduction benefits. Alternatively, a long data unit of, for instance, 1,000 bytes can have a receive time of approximately 800 nanoseconds for a data link with a data rate of 10 Gbps, and this can provide plenty enough time to hide the delays associated with data unit processing (e.g., ingress data unit processing).

Various embodiments can take advantage of the benefits of starting data unit processing early without introducing challenges associated with conventional cut-through forwarding (e.g., chance of forwarding corrupted data units, forwarding the data unit via incorrect interfaces, or both). By use of various embodiment, cut-through forwarding can be used while hiding (or almost hiding) latency associated with ingress data unit processing (e.g., header processing) behind data unit reception.

For some embodiments, a data unit forwarding system performs cut-through forwarding such that the data unit is forwarded with zero data unit processing latency (e.g., similar to conventional store-and-forward system), where well-formed received data units (e.g., packets without errors) are transmitted via the correct transmission ports and malformed received data units are not forwarded at all (e.g., dropped). Additionally, for some embodiments, a data unit forwarding system's state (e.g., with respect to data unit policers, counters, etc.) are updated correctly despite the fact that the state update events are based on a data unit's headers, which have a quality that is unknown while they are being processed (e.g., the entire data unit has not been received yet and its CRC value has not been validated or the data unit's length (e.g., byte count) has not yet been determined).

As used herein, a data unit can comprise a data packet (or packet) or a data frame, either of which can be defined in accordance with a network standard or protocol (e.g., defined by IEEE network standard, such as Ethernet). A data unit can be divided into a header portion that comprises header data, and a non-header portion (e.g., body or payload portion) that comprises non-header data, such payload data.

The data unit forwarding system of various embodiments is a protocol-independent data unit forwarding system and can be configured to process and forward data units of various communication protocol types, such as Ethernet, Internet Protocol (IP), IP version 4 (IPv4), IP version 6 (IPv6), User Datagram Protocol (UDP), Audio Video Transport Protocol (AVTP), and the like. The data unit forwarding system of various embodiments comprise a plurality of functional components that provide functionality to properly process and forward a data unit to its intended network destination. For instance, the functional components can provide functionality such as interpreting headers included in a data unit, identifying a data unit's network destination, re-encapsulating the payload as needed, and the like. The functional components can be communication protocol type agnostic, meaning that the functional components can use a common set of operations, logic, templates, or tables to process a data unit regardless of its communication protocol type. Accordingly, the protocol independent data unit forwarding system can process different types of data units or can forward data units in different types of network segments.

According to various embodiments, a system (e.g., data unit forwarding system) comprises one or more of a port manager, an ingress processor, and a data unit buffer. The port manager can comprise a set of input ports to receive data units from a transmitting network device, and the port manager can be configured to initiate reception of a data unit via a select port of the set of input ports, where the data unit comprises a header portion (e.g., header byte string) and a non-header portion (e.g., body or payload portion of the data unit). An ingress processor can be configured to perform operations for cut-through forwarding. For example, the operations can comprise the ingress processor initiating reception of the header portion of the data unit from the port manager. After the header portion has finished being received by the ingress processor from the port manager and prior to the port manager finishing reception of the data unit, the ingress processor can initiate ingress processing (e.g., parsing) of the header portion. The ingress processor can detect for when the data unit has finished being received by the port manager, and can detect for when the ingress processing of the header portion has finished, where the ingress processing generates processed header data. For instance, the processed header data can comprise metadata (e.g., metadata item) for the data unit. After both the data unit has finished being received by the port manager and the ingress processing of the header portion has finished, the ingress processor can determine whether an error was detected while the data unit was being received by the port manager. In response to determining that the error was not detected while the data unit was being received by the port manager, the ingress processor can perform a set of subsequent operations based on the processed header data. Eventually, after the set of subsequent operations has completed performance, the ingress processor can generate an acknowledgement indication that the data unit is ready for forwarding to another network device.

The set of subsequent operations can comprise at least one data-unit-length dependent operation, and ingress processor can access data unit length information for the data unit, where the data-unit-length dependent operation is performed based on the data unit length information. For instance, the system can comprise a data unit policer (or policer) configured to monitor data rate (e.g., byte rate) of a data flow and enforce a per-flow bandwidth limit, and the set of subsequent operations can comprise an operation relating to the data unit policer. For example, the data unit policer can monitor a data rate of a data flow and actively drop packets from the data flow that exceed certain limits. The number of data units dropped by the data unit policer can be sufficient to bring the data flow's enqueued bandwidth within limits.

For some embodiments, the data unit buffer is configured to initiate reception of the data unit from the port manager, and send an indication to the ingress processor when the data unit buffer has finished receiving the data unit (in its entirety) from the port manager. The indication can at least indicate that the data unit has finished being received by the port manager. The port manager can be configured to generate data unit length information for the data unit after the port manager has finished receiving the data unit, where the indication to the ingress processor can comprise the data unit length information. Accordingly, the ingress processor can access the data unit length information for the data unit to perform a data-unit-length dependent operation included by the set of subsequent operations. As another example, the set of subsequent operations can comprise an operation based on a data unit counter. As another example, the set of subsequent operations can comprise an operation that checks a length of the data unit.

For various embodiments, the data unit buffer is configured to initiate reception of the data unit from the port manager, and to send a confirmation indication to the ingress processor when the data unit buffer has finished receiving the data unit from the port manager and storing the data unit on the data unit buffer. The confirmation indication can indicate that the data unit has finished being received by the port manager. After sending the confirmation indication to the ingress processor, the data unit buffer can receive the acknowledgement indication from the ingress processor, and cause the data unit stored on the data unit buffer to be forwarded to the other network device. For instance, the data unit buffer can cause the data unit (stored on the data unit buffer) to be forwarded to the other network device by sending the data unit to an egress processor of the system, where the egress processor is configured to receive the data unit from the data unit buffer for forwarding.

For some embodiments, the data unit buffer is configured to initiate reception of the data unit from the port manager, finish receiving the data from the port manager, and store the data unit on the data unit buffer. The data unit buffer can receive the data unit from the port manager in parallel with the ingress processor receiving the header portion of the data unit from the port manager. The ingress processor can be configured to generate queue information (e.g., selection of a queue in the data unit buffer) based on at least one operation of the set of subsequent operations, and send the queue information to the data unit buffer, the data unit buffer being configured to queue the data unit in the data unit buffer based on the queue information.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example data unit forwarding system 100 that supports cut-through forwarding with early ingress processing of a data unit, in accordance with some embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. For some embodiments, various additional functional components are supported by the data unit forwarding system 100 to facilitate additional functionality that is not specifically described herein.

Referring now to FIG. 1, the data unit forwarding system 100 can be part of (e.g., implemented as part of) a network device operatively coupled to one or more network devices over one or more data links (e.g., Ethernet data links). For instance, the data unit forwarding system 100 can be implemented on the network device, at least in part, by a physical layer network device of the network device. A network device can be of any of a variety of types of devices capable of network communication with other network devices. Examples of network devices can include, without limitation, a computing device (e.g., laptop or mobile device), a bridge, a router, a network switch, or the like. The data unit forwarding system 100 can provide for (or otherwise facilitate) the exchange of data units between various interconnected network devices. For instance, a network device can include some or all of the features, components, and peripherals of the machine 600 shown in FIG. 6.

As shown, the data unit forwarding system 100 comprises multiple components (e.g., functional components) coupled in series to provide a data processing pipeline for data unit forwarding, which can support cut-through forwarding with early ingress processing of data units as described herein. Each component can be a physical data processing element configured to perform one or more data processing functions based on received input data. A functional component can generate a data output, which can be provided as input into other functional components in the data processing pipeline. In FIG. 1, the data unit forwarding system 100 comprises a port manager 102 for receiving one or more data units (e.g., received data units), an ingress processor 104, a data unit buffer 106, an egress processor 108, and a port manager 110 for transmitting one or more data units (e.g., forwarded data units).

For some embodiments, the port manager 102 supports one or more Media Access Controllers (MACs) and operates to receive, via one or more receive ports (e.g., external network port), one or more incoming data units 122 transmitted to the data unit forwarding system 100 over a data link. The receive ports can include, without limitation, Ethernet and specialty ports, such as Camera Serial Interface (CSI), Controller Area Network (CAN), Local Interconnect Network (LIN), and the like. Each receive port can be identified by a unique port identifier.

After receiving a data unit (e.g., via a receive port), receive port manager 102 can perform a one or more data processing operations to generate an output that can be provided to the other functional components of the data unit forwarding system 100. For instance, the port manager 102 can initially perform any media specific adaptations on the received data unit as well as multiplex the data units of receive ports to a multiplexed path of the data processing pipeline such that the data unit, or any portion, thereof may be transmitted to the other downstream functional components of the data unit forwarding system 100.

After multiplexing the data unit, the port manager 102 can identify header data of a data unit. For some embodiments, the header data comprises a header byte string, which can include a subset of the ordered set of individual values (e.g., bytes) from the data unit. For instance, the header byte string can include a predetermined number of the first ordered values (e.g., first n bytes) from the data unit. The predetermined number may be any number that is less than or equal to the total number of values in the data unit. Additionally, the predetermined number used can be selected to encompass all relevant header data included in the data unit, while remaining small enough that the size of the header byte string does not provide undue burden during subsequent processing of the header byte string.

Eventually, the port manager 102 can provide data to the ingress processor 104 and the data unit buffer 106 (e.g., packet buffer) via one or more data paths. As shown, from the data units 122 received by the port manager 102, the port manager 102 provides the ingress processor 104 with at least a header portion 140 (e.g., header byte string) of a data unit received by the port manager 102, and provides the data unit buffer 106 with the entire the data unit 130. For some embodiments, the port manager 102 provides the ingress processor 104 with the header portion 140 while the data unit is still being received. Depending on the embodiment, the port manager 102 can either provide the ingress processor 104 with the header portion 140 (in its entirety) after at least the header portion 140 is completely received by the port manager 102, or start providing the header portion 140 to the ingress processor 104 as the header portion 140 is still being received. Additionally, depending on the embodiment, the port manager 102 can either provide the data unit buffer 106 with the entire data unit 130 after the data unit 130 is received in its entirety (e.g., completely received) by the port manager 102, or start providing the data unit 130 to the data unit buffer 106 as the data unit 130 is still being received by the port manager 102.

For some embodiments, the port manager 102 generates a metadata item for the data unit that describes the context of the data unit. For example, the metadata item includes a series of values that describe a context of the data unit that can be used by one or more functional components of the data unit forwarding system 100 to process the data unit. For instance, a functional component of the data unit forwarding system 100 can use the values in the metadata item to determine which operation the functional component is to perform to process the data unit. Additionally, as an individual operation is performed, the metadata item for the data unit can be updated to further define the context of the data unit. For example, the metadata item of the data unit can be updated by the ingress processor 104 (based on the resulting output of an operation the ingress processor 104) performs by adding new values to the metadata item, modifying existing values in the metadata item, and the like. The port manager 102 can configure some initial data values in the metadata item. For instance, the port manager 102 can include one or more data values in the metadata item, which can for example identify the port via which the data unit was received (e.g., unique port identifier), a data length of the data unit (e.g., byte count), a time stamp of the time at which the data unit was received, or data identifying any errors that may have been detected during reception of the data unit. Though not illustrated, for some embodiments, the port manager 102 provides the ingress processor 104, the data unit buffer 106, or both with the metadata item for a data unit. For example, the port manager 102 can provide the ingress processor 104 with a metadata item of a data unit and the header portion 140 of the data unit, the ingress processor 104 can process the header portion 140 and generate an updated metadata item based on that processing, and the ingress processor 104 can provide (as output) the updated metadata item to the data unit buffer 106, which can queue the data unit (it received from the port manager 102) based on the updated metadata item received from the ingress processor 104.

According to various embodiments, the ingress processor 104 is configured to perform one or more specific operations to support cut-through forwarding with early ingress data unit processing. Additionally, for some embodiments, the data unit buffer 106 is configured to perform one or more specific operations, and to interact with the ingress processor 104, to support cut-through forwarding with early ingress data unit processing. Depending on the embodiment, the ingress processor 104 can perform one or more of parsing, decapsulation, lookup, or forwarding decision operations based on the header portion 140 received from the port manager 102. More regarding the ingress processor 104 and the data unit buffer 106 is discussed with respect to FIGS. 2 and 3, which described and illustrates an example implementation of the ingress processor 104 in accordance with some embodiments.

For some embodiments, the data unit buffer 106 provides temporary storage and queuing for data units while the data unit waits for processing by the ingress processor 104 to complete (e.g., based on the header portion 140). Additionally, the data unit buffer 106 can queue a given data unit until a queuing scheduling algorithm (e.g., of the data unit buffer 106) can service the data unit queue. For some embodiments, the data unit buffer 106 interacts with the ingress processor 104 to manage the resources of the data unit buffer 106. For instance, the ingress processor 104 can select a queue in the data unit buffer 106 for a data unit (e.g., based on a queue selection process performed on the data unit based on the header portion 140), and during that process the ingress processor 104 can query the data unit buffer 106 for a state of the select queue. Eventually, data (e.g., metadata or an update metadata item) provided by the ingress processor 104 can include information relating to the queue selected by the ingress processor 104. The data unit buffer 106 can link stored data units to data (e.g., metadata or an updated metadata item) provided by the ingress processor 104.

For some embodiments, the egress processor 108 accepts one or more data units from the data unit buffer 106 (e.g., as a stream of interlaced data units based on a queue) and performs one or more operations for preparing the data units for output (e.g., egress) from the data unit forwarding system 100. The one or more operations performed by the egress processor 108 can include re-encapsulation of a forwarded data unit. For various embodiments, the egress processor 108 provides (e.g., delivers) one or more data units to the port manager 110 (for transmitting data units), which can transmit the one or more data units (as outgoing data unit(s) 124) from the data units forwarding system 100 via one or more transmission ports, thereby forwarding the data unit to its next network destination.

Figure 2:
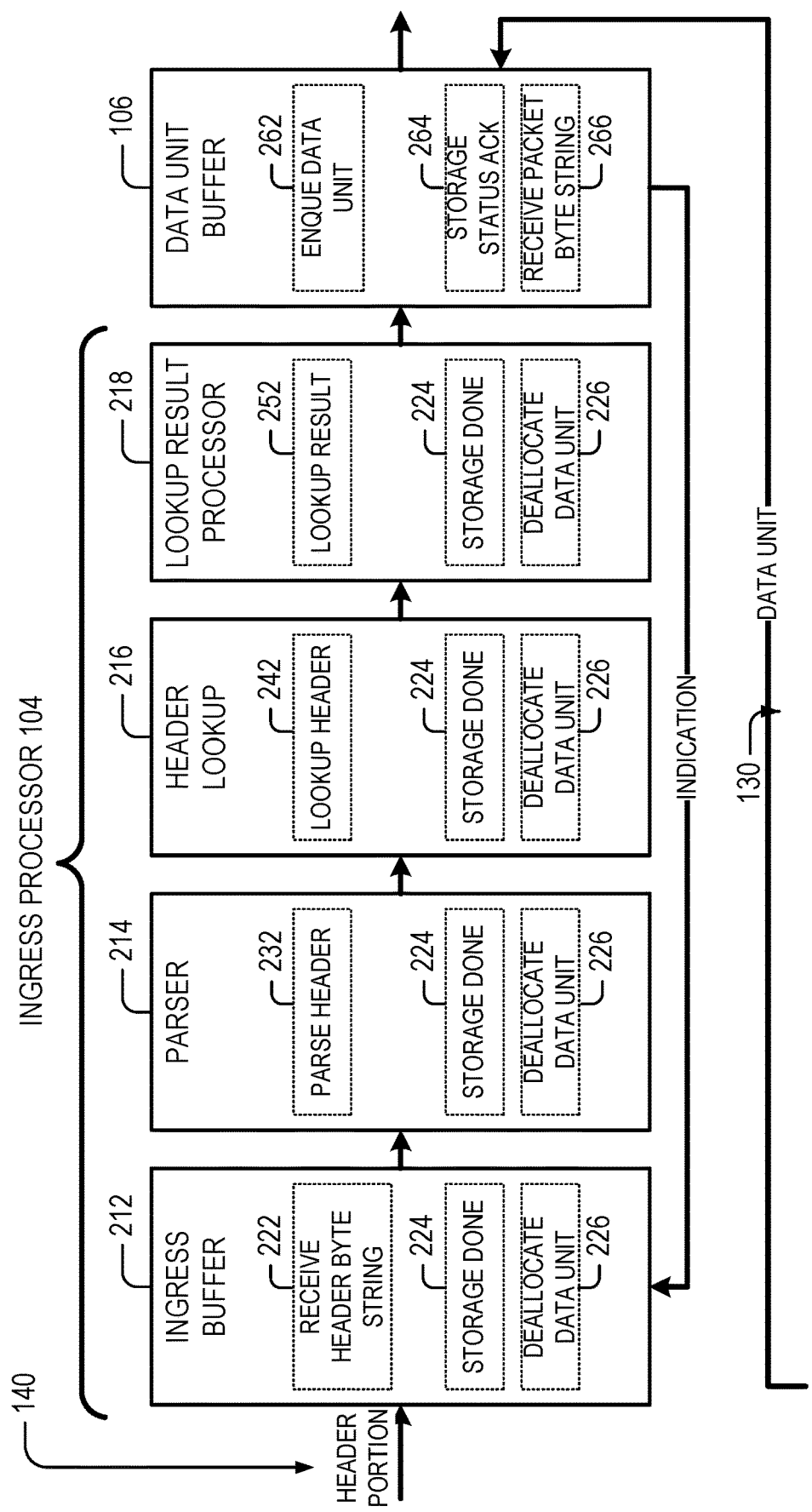
FIG. 2 is a block diagram illustrating an example implementation of an ingress processor that supports cut-through forwarding with early ingress processing of a data unit, in accordance with some embodiments.

FIG. 2 is a block diagram illustrating an example implementation of an ingress processor 104 that supports cut-through forwarding with early ingress processing of a data unit, in accordance with some embodiments. As shown, the ingress processor 104 comprises an ingress buffer 212, a parser 214, a header lookup 216, and a lookup result processor 218. While a data unit is still being received by (e.g., the port manager 102 of) the data unit forwarding system 100 from a transmitting network device over a data link, the ingress processor 104 receives (or begins receiving) a header portion (e.g., 140) of the data unit via the ingress buffer 212, and the data unit buffer 106 receives (or begins receiving) the data unit (e.g., 122) being received by the data unit forwarding system 100. For instance, operation 222 can cause the ingress processor 104 to receive (or being receiving) the header byte string of the data unit, and operation 266 can cause the data unit buffer 106 to receive (or being receiving) the entire data unit. While operations 222 and 266 can be performed simultaneously, operation 266 is likely to complete later than operation 222. After the ingress buffer 212 receives the entire header portion, the parser 214 obtains the header portion (e.g., the entire header byte string) from the ingress buffer 212, and begins ingress processing (e.g., parsing) the header portion by operation 232, which can occur while the remainder of the data unit (e.g., non-header portion of the data unit) is still being received by the data unit forwarding system 100. The initiation of operation 232 can represent initiation of ingress processing of the data unit.

During operation 232, the parser 214 can determine types and locations of one or more headers that are present in the header portion (e.g., the header byte string) of data unit. For example, the parser 214 can determine the types of headers and the offset and width (e.g., a range pair) defining the location of the headers in the header portion. For some embodiments, an individual header does not include encoded values that identify the header's type, and a previous (e.g., outer) header indicates the header type of the next sequential header in the header portion. Accordingly, for some embodiments, the parser 214 uses a header-by-header incremental process to determine the overall structure of one or more headers included in the header portion of the data unit. As the outermost (e.g., first) header does not have a previous header from which to access a next header type, the parser 214 can use a metadata item received from a port manager (e.g., 102) to identify the header type of the outermost (e.g., first) header. For instance, the parser 214 can identify the header type of the outermost header based on data (e.g., the metadata item provided by the port manager 102) identifying the port via which the data unit was received (e.g., unique port identifier) by the data unit forwarding system 100. For example, each port or port identifier can be mapped to a header type (e.g., by the port manager 102). Accordingly, the parser 214 can determine the header type mapped to the unique port identifier received in the metadata items, which is inferred to be the header type of the outermost header. The mapping between the ports and the header types of the outermost header can permit the parser 214 to operate with any of a variety of network types.

As shown, the parser 214 is followed in the data processing pipeline by the header lookup 216, and the header lookup 216 is followed by the lookup result processor 218. According to various embodiments, after the parser 214 completes processing the header portion (e.g., completion of operation 232), the ingress processor 104 waits (e.g., pauses additional processing) until the data unit buffer 106 indicates that the data unit (e.g., 122) has completed reception (e.g., from the port manager 102) prior to performing one or more subsequent operations (e.g., by the header lookup 216, the lookup result processor 218, or both), thereby deferring such operations. In this way, the one or more subsequent operations can be regarded as deferred operations. One or more of the subsequent operations can depend on knowing the length of the data unit that is not known until after the data unit forwarding system 100 (e.g., the port manager 102) finishes reception of the data unit. By waiting for the data unit buffer 106 to indicate that the data unit buffer 106 has completed reception of the data unit (e.g., 120), the data unit forwarding system 100 can ensure that the length of the data unit is known prior to the one or more subsequent operations being performed by the ingress processor 104. Examples of subsequent operations can include, without limitation, an operation associated with a data unit policer (or policer) or an operation associated with a counter. Policers and counters can operate on bytes and can operate based on length of each data unit upon which they operate. Accordingly, the state of policers and counters of the data unit forwarding system 100 rely on completion of data unit reception, and knowing the length of a received data unit.

For some embodiments, the data unit forwarding system 100 (e.g., the data unit buffer 106) uses operation 224 ("storage done") to provide (e.g., deliver) an indication ("storage done indication") to the ingress processor 104 (e.g., to one or more of the ingress buffer 212, the parser 214, the header lookup 216, and the lookup result processor 218) that the data unit buffer 106 has completed reception of the entire data unit and stored the data unit in the data unit buffer 106. Additionally, for some embodiments, performance of operation 224 can cause the ingress processor 104 (e.g., to one or more of the ingress buffer 212, the parser 214, the header lookup 216, and the lookup result processor 218) to be informed of the length of the received data unit, and any errors that may have been detected during reception of the data unit (e.g., by the port manager 102). By operation 224, the ingress processor 104 can continue processing of the data unit based on the header unit by performing the one or more subsequent operations (e.g., one or more data-unit-length dependent operations) that were deferred prior to operation 224. After the ingress processor 104 has completed processing of the data unit (e.g., completed performance of the one or more subsequent operations), the ingress processor 104 can provide the data unit buffer 106 with its processing results for the data unit, which can include an update metadata item for the data unit. Additionally, after the ingress processor 104 has completed processing of the data unit, the ingress processor 104 can use operation 264 ("storage status acknowledge") to indicate (e.g., acknowledge) to the data unit buffer 106 that the ingress processor 104 has completed the processing. Operation 264 can cause an indication to be generated and sent to the data unit buffer 106. This indication can also indicate that a storage status of the data unit buffer 106 has been received by each component of the ingress processor 104. Upon the data unit buffer 106 receives the indication by operation 264, the data unit buffer 106 can proceed with next steps in processing the stored data unit for transmission (e.g., forwarding) from the data unit forwarding system 100 to its next network destination. After receiving the indication, operation 262 causes the data unit buffer 106 to enqueue the data unit to an output queue of the data unit buffer 106 for eventual transmission (e.g., forwarding) of the data unit.

Accordingly, for some embodiments, the parser 214 waits to provide (e.g., deliver) output (e.g., an updated metadata item) to the header lookup 216 until after the parser 214 (or the ingress processor 104) receives an indication from the data unit buffer 106 that the entire data unit has been received and stored by the data unit buffer 106. The indication can comprise an identifier for the data unit so that the ingress processor 104 is aware of which data unit has completed reception and storage. For some embodiments, the parser 214 and the header lookup 216 work together to process the data unit header-by-header. For example, each pass through a header processing loop (not shown) performed by the parser 214 and header lookup 216 processes or "consumes" a single layer of headers. In each pass through the header processing loop, the parser 214 can provide the header lookup 216 with an updated metadata item that includes data describing a subsequent layer of headers included in the data unit, such as the header types and range pair for each header in the layer of headers. In turn, the header lookup 216 can further process the data unit based on the subsequent layer of headers.

The header lookup 216 can use a single, flexible search argument assembly and lookup operation (hereafter, lookup operation) to support the various operations performed by the header lookup 216. Such various operations can include refining the data unit's context (e.g., updating the metadata item), managing the contents of forwarding tables, testing the data unit against access control lists, determining the data unit's destination and/or forwarding requirements, hashing flow-identifying entropy for load balancing purposes, and the like. The parser 214 can provide (e.g., via the updated metadata item) non-enumerated layer type values to the header lookup 216. At operation 242, the header lookup 216 can generate one or more search arguments based on such values and use the one or more search arguments to perform one or more (header) lookup operations in tables that hold keys that are compatible with the assembled search arguments. For instance, the header lookup 216 uses data included in the updated metadata item to retrieve sets of parameters that are used to configure bit-field extractors. Examples of data included in the metadata item include layer type values, layer offset values, port identifier for a physical receive port, port identifier for a logical receive port, layer 2 forwarding domain, layer 3 forwarding domain, header type, quality of service code points (e.g., priority), address value type (e.g., unicast, multicast, etc.), and the like. The configured bit-field extractors are then used to concatenate arbitrary strings of header data into the search arguments, which are used to perform the lookup operations.

Different types of lookup operations (e.g., search algorithms) can be used by the header lookup 216 for different purposes. For instance, an indexed read lookup operation may be used to map a data unit's port identifier to the destination identifier. As another example, an exact-match search lookup operation may be used to bridge Ethernet data units (e.g., Ethernet packets) based on their headers. As another example, a longest-prefix match lookup operation may be used to route data based on their headers (e.g., IPv4 or IPv6). Generation of search arguments and performing lookup operations in this manner enables the header lookup 216 to operate freely of fixed relationships between a data unit's forwarding header type, forwarding method, or the lookup algorithms used to make forwarding or other decisions based on header contents.

Each lookup operation by the header lookup 216, whether successful or not, returns some data. For example, successful lookups (e.g., those where a matching key is found) can return data that is associated with the matching key value. Unsuccessful lookups can return default data that is associated with the table in which the lookup operation was performed. In either case, the data returned as a result of a lookup operation can be used to determine a subsequent set of actions performed by the header lookup 216.

Prior to providing output to the lookup result processor 218, the header lookup 216 can determine a first forwarding instruction to be performed to forward the data unit to its network destination. The header lookup 216 can determines the first forwarding instruction during performance of the lookup operations (described above) by the header lookup 216. The header lookup 216 can provides the lookup result processor 218 with data identifying the first forwarding instruction, such as by updating the metadata item to include a value that points to the first instruction. This can be performed using an action instruction that is returned as a result of a destination-determining lookup operation. Similarly, other methods for setting the value that points to the first instruction can also be used.

At operation 252, the lookup result processor 218 can use a value (provided by the header lookup 216) that points to a first instruction to determine a forwarding decision. The forwarding decision can incorporate such behaviors as load balancing, multicast replication, and the like. A number of other functions can be performed by the lookup result processor 218, such as selecting a queue (e.g., output queue) in the data unit buffer 106 for the data unit to be forwarded. Alternatively, the forwarding decision can be limited to identifying the transmit port to be used to forward the data unit to its intended network destination. Depending on the embodiment, a single transmit port can be served by multiple queues in the data unit buffer 106, each with its own relative priority, bandwidth limits, and other quality of service-related characteristics. After identifying the transmit port for the data unit, the lookup result processor 218 can use data included in the updated metadata item (e.g., the context of the data unit) provided by the header lookup 216 and values conveyed by its priority related field to select one of the queues of the data unit buffer 106 that service the transmit port. After the queue is selected, the data unit can be ready to be enqueued by the data unit buffer 106 at operation 262 to the output queue for eventual transmission of the data unit.

Eventually, the data unit buffer 106 uses operation 226 to deallocate the data unit (e.g., deallocate the data unit identifier) from the ingress processor 104. The data unit to be deallocated can be identified by an identifier for the data unit. For some embodiments, the deallocation of a data unit from the ingress processor 104 concludes an ingress lifecycle of the data unit. After the ingress processor 104 indicates the data unit is ready for forwarding, the data unit (e.g., data unit byte string) can then be retrieved from the data unit buffer 106 by a next functional component of the data unit forwarding system 100 (e.g., the egress processor 108).

Figure 3:
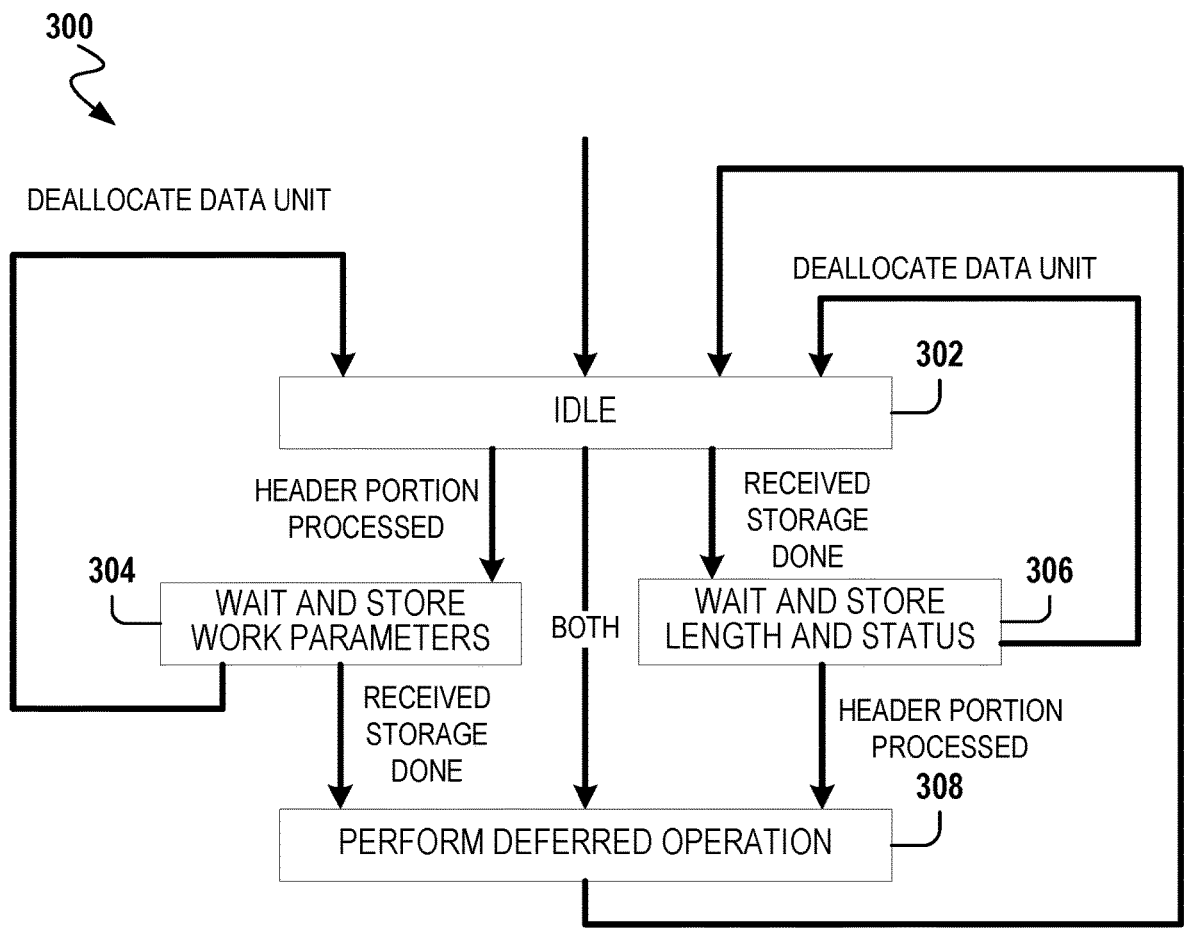
FIG. 3 is a flowchart illustrating a state machine of an example mechanism that can be included by one or more functional components of an ingress processor to support deferred operations, in accordance with some embodiments.

FIG. 3 is a flowchart illustrating a state machine 300 of an example mechanism that can be included by one or more functional components of an ingress processor to support deferred operations, in accordance with some embodiments. The mechanism described by the state machine 300 depends on events happening in pairs: a header is processed by the data processing pipeline of the ingress processor (e.g., 104); and a storage status is delivered by data unit buffer (e.g., 106) to the ingress processor. As shown, the state machine 300 starts at an idle state 302, and proceeds to: state 304 if the ingress processor has finished processing the header portion of the data unit, but a storage done indication for the data unit has not been received from the data unit buffer; state 306 if a storage done indication for the data unit has been received from the data unit buffer, but the ingress processor has not finished processing the header portion of the data unit; or state 308 if both the ingress processor has finished processing the header portion of the data unit and a storage done indication for the data unit has been received from the data unit buffer.

At state 304, the ingress processor stores work parameters generated by the ingress processor during processing of the header portion, and waits: to receive the storage done indication from the data unit buffer, after which the state machine 300 proceeds to state 308; or to receive a deallocate data unit request, after which the state machine 300 returns to the idle state 302. At state 306, the ingress processor stores a length of the data unit and receive status (e.g., was there an error during reception of the data unit, and waits: for the processing of the header portion of the data unit to finish, after which the state machine 300 proceeds to state 308; or to receive a deallocate data unit request, after which the state machine 300 returns to the idle state 302. At state 308, the ingress processor performs one or more deferred operations (based on at least one of information from ingress processing the header portion of the data unit, the length of the data unit, or the receive status of the data unit) and after the deferred operations are complete, the state machine 300 returns to the idle state 302.

It is possible for the ingress processor to drop a data unit if the data unit arrival rate exceeds the ingress processor's ability to introduce new data unit into the processing pipeline of the ingress processor. To avoid the state machine 300 locking up, the ingress processor can: (i) discard an indication by a data unit buffer (e.g., 106) that a specific data unit (e.g., identified by an identifier) has completed reception and storage by the data unit buffer if that specific data unit has already been dropped by the ingress processor; or (ii) delay retrieving the indication from the data unit buffer while a drop/don't drop decision is pending by the ingress processor. Additionally, to guard against missing operations, the state machine 300 resets to the idle state 302 when a data unit is deallocated by the data unit buffer (e.g., via operation 226).

Figure 4:
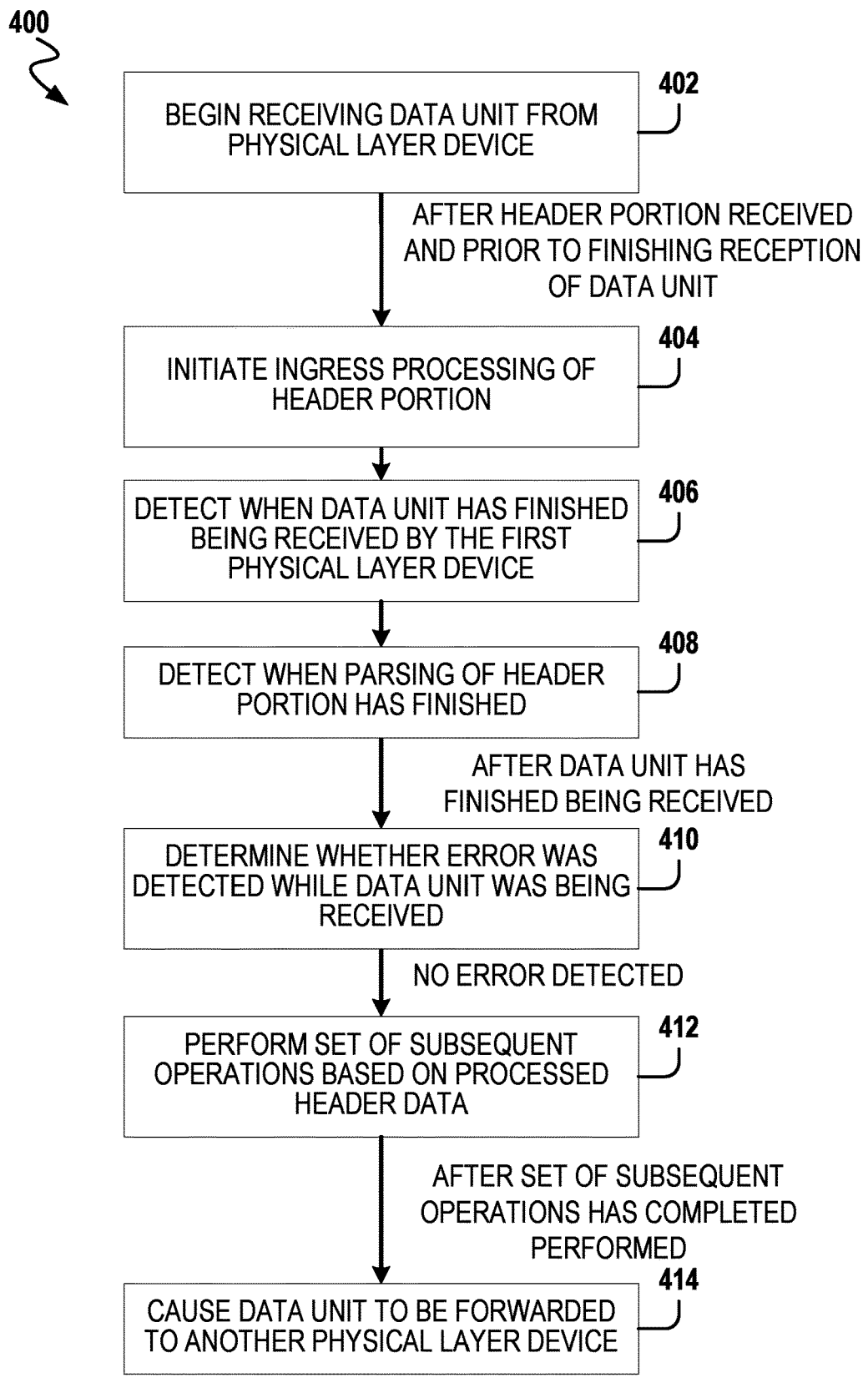
FIG. 4 is a flowchart illustrating an example method for cut-through data forwarding with early ingress processing of a data unit, in accordance with some embodiments.

FIG. 4 is a flowchart illustrating an example method 400 for cut-through data forwarding with early ingress processing of a data unit, in accordance with some embodiments. It will be understood that example methods described herein may be performed by various components (e.g., functional or circuit components). For instance, the methods 400 can be performed by one or more functional components of the data unit forwarding system 100 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to the method 400 of FIG. 4, at operation 402, a first network device (e.g., a first physical layer device) begins receiving a data unit from a second network device (e.g., a second physical layer device), where the data unit comprises a header portion and a non-header portion. For example, the first network device can comprise a port manager (e.g., 102), where the port manager comprises a set of input ports to receive data units from a transmitting network device, and the port manager is configured to initiate reception of a data unit via a select port of the set of input ports. The first network device can comprise a first physical layer device, and the second network device can comprise a second physical layer device.

After the header portion has finished being received by the first network device (e.g., port manager), and prior to the first network device finishing reception of the data unit, at operation 404, the first network device initiates ingress processing (e.g., parsing) of the header portion at the first network device. For some embodiments, operation 404 is performed by an ingress processor (e.g., 104) of the first network device.

Thereafter, at operation 406, the first network device detects for when the data unit has finished being received by the first network device. For some embodiments, operation 406 is performed by an ingress processor of the first network device. For instance, a port manager of the first network device can receive the data unit, and can inform the ingress processor when the port manager has finished reception of the data unit. In another example, a data unit buffer (e.g., 106) of the first network device can receive the data unit in its entirety (e.g., from the port manager), can store the data unit, and can inform the ingress processor when the data unit has finished receiving and storing the data unit. The data unit buffer can receive the data unit from the port manager in parallel with the ingress processor receiving the header portion of the data unit from the port manager. Additionally, at operation 408, first network device detects for when the ingress processing (e.g., parsing) of the header portion has finished. For some embodiments, the ingress processing of the header portion generates processed header data, which can comprise metadata (e.g., updated metadata item). Further, for some embodiments, operation 408 is performed by an ingress processor of the first network device. Depending on the embodiment, operations 406 and 408 can be performed in parallel. Additionally, operations 406 and 408 can be performed while the data unit is still being received by the first network device (e.g., by a port manager of the first network device).

Eventually, after both the data unit has finished being received by the first network device and the first network device has finished the ingress processing (e.g., parsing) of the header portion, at operation 410, the first network device determines that an error was detected while the data unit was being received by the first network device. For some embodiments, operation 410 is performed by an ingress processor of the first network device. For instance, a port manager of the first network device can receive the data unit, and can inform the ingress processor (e.g., via a metadata item for the data unit provided by the port manager to the ingress processor) whether an error (e.g., CRC error) was detected or experienced while receiving the data unit.

In response to determining that the error was not detected while the data unit was being received by the first network device (e.g., a port manager of the first network device), at operation 412, the first network device performs a set of subsequent operations based on the processed header data. For some embodiments, operation 412 is performed by an ingress processor of the first network device. As described herein, the set of subsequent operations can comprise one or more operations deferred until after the data unit has finished being received by the first network device, after which a length of the data unit is known by the first network device. Accordingly, the first network device can access data unit length information for the data unit to perform the data-unit-length dependent operation based on the data unit length information. For instance, an ingress processor of the first network device can access the data unit length information to perform the data-unit-length dependent operation, and the data unit length information can be provided to the ingress processor by a port manager of the first network device (e.g., via a metadata item for the data unit provided by the port manager to the ingress processor) or by a data unit buffer of the first network device that receives a copy of the data unit. The data-unit-length dependent operation can be an operation associated with, for example, a data unit policer or a data unit counter. Additionally, at least one of the subsequent operations can determine (e.g., generate) a forwarding instruction for the data unit based on the processing of the header portion of the data unit.

After the first network device has completed performing the set of subsequent operations, at operation 414, the first network device causes the data unit to be forwarded to a third network device (e.g., third physical layer device). For some embodiments, operation 414 is performed by an ingress processor of the first network device. For example, the ingress processor of the first network device can provide a data unit buffer of the first network device with information regarding forwarding the data unit, and the ingress processor can indicate to the data unit buffer that the data unit buffer (stored on the data unit buffer) is ready to be forwarded. For instance, the ingress processor can provide the data unit buffer with information including queue selection and a forwarding instruction, and the ingress processor can provide such information via metadata (e.g., an updated metadata item generated based on one or more subsequent operations) provided to the data unit buffer by the ingress processor.

Figure 5:
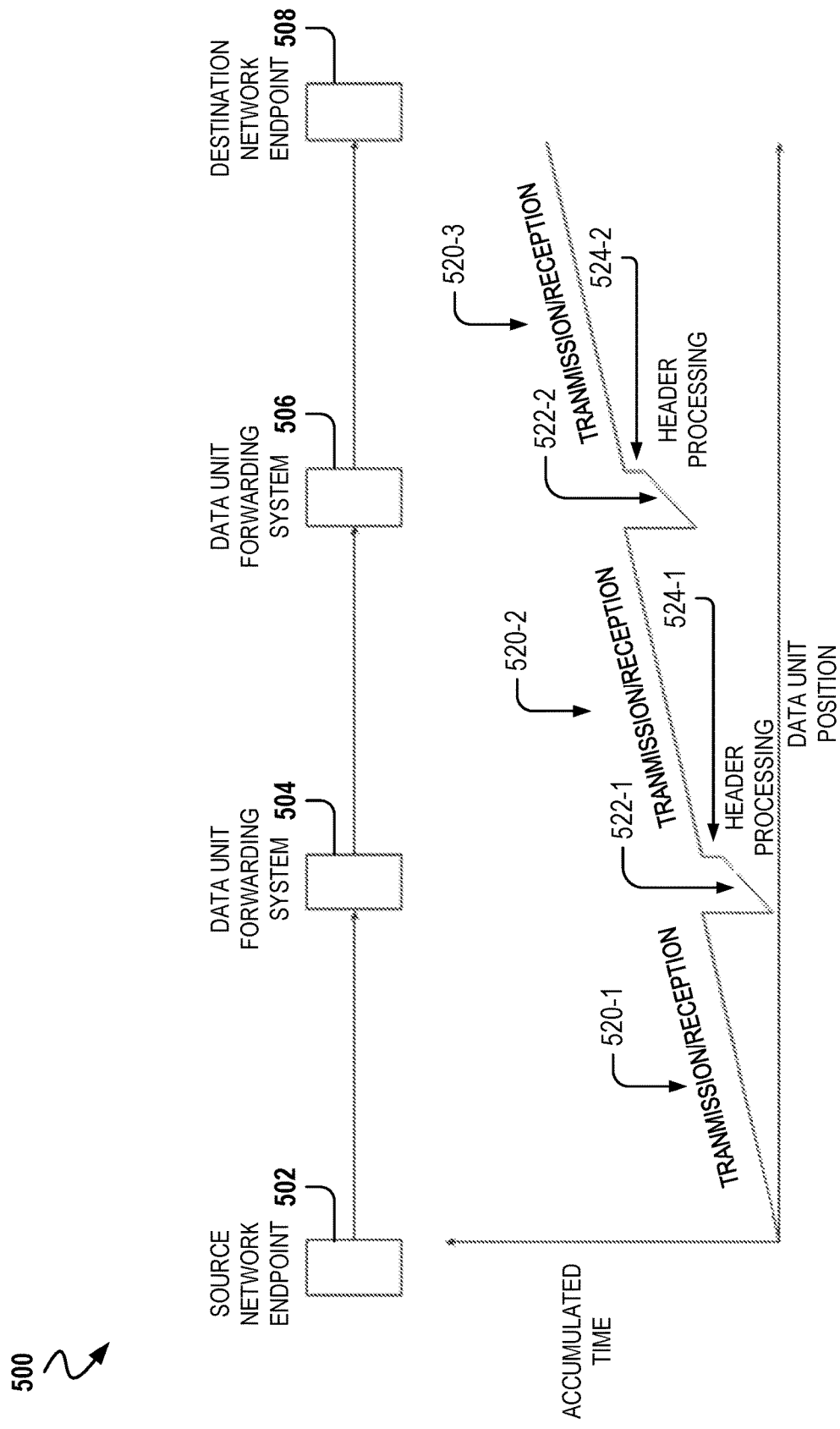
FIG. 5 is a graph illustrating accumulated time for a network system that includes example data unit forwarding systems that each implement cut-through forwarding with early ingress processing of a data unit, in accordance with some embodiments.

FIG. 5 is a graph 500 illustrating accumulated time for a network system that includes example data unit forwarding systems 504, 506 that each implement cut-through forwarding with early ingress processing of a data unit, in accordance with some embodiments. In particular, the graph 500 illustrates accumulated time as a data unit passes from source network endpoint 502 to a data unit forwarding system 504, to a data unit forwarding system 506, to a destination network endpoint 508. As shown, reference 520-1 designates when the data unit is being transmitted from the source network endpoint 502 and received by the data unit forwarding system 504, reference 520-2 designates when the data unit is being transmitted from the data unit forwarding system 504 and received by the data unit forwarding system 506, and reference 520-3 designates when the data unit is being transmitted from the data unit forwarding system 506 and received by the destination network endpoint 508. Reference 522-1 designates when the header portion of the data unit is processed by the data unit forwarding system 504, and reference 522-2 designates when the header portion of the data unit is processed by the data unit forwarding system 506. Additionally, reference 524-1 designates time delay after the header portion has finished processing at the data unit forwarding system 504, during which the data unit forwarding system 504 finishes receiving the remainder (e.g., of the non-header portion) of the data unit. Likewise, reference 524-2 designates time delay after the header portion has finished processing at the data unit forwarding system 506, during which the data unit forwarding system 506 finishes receiving the remainder (e.g., of the non-header portion) of the data unit.

Figure 6:
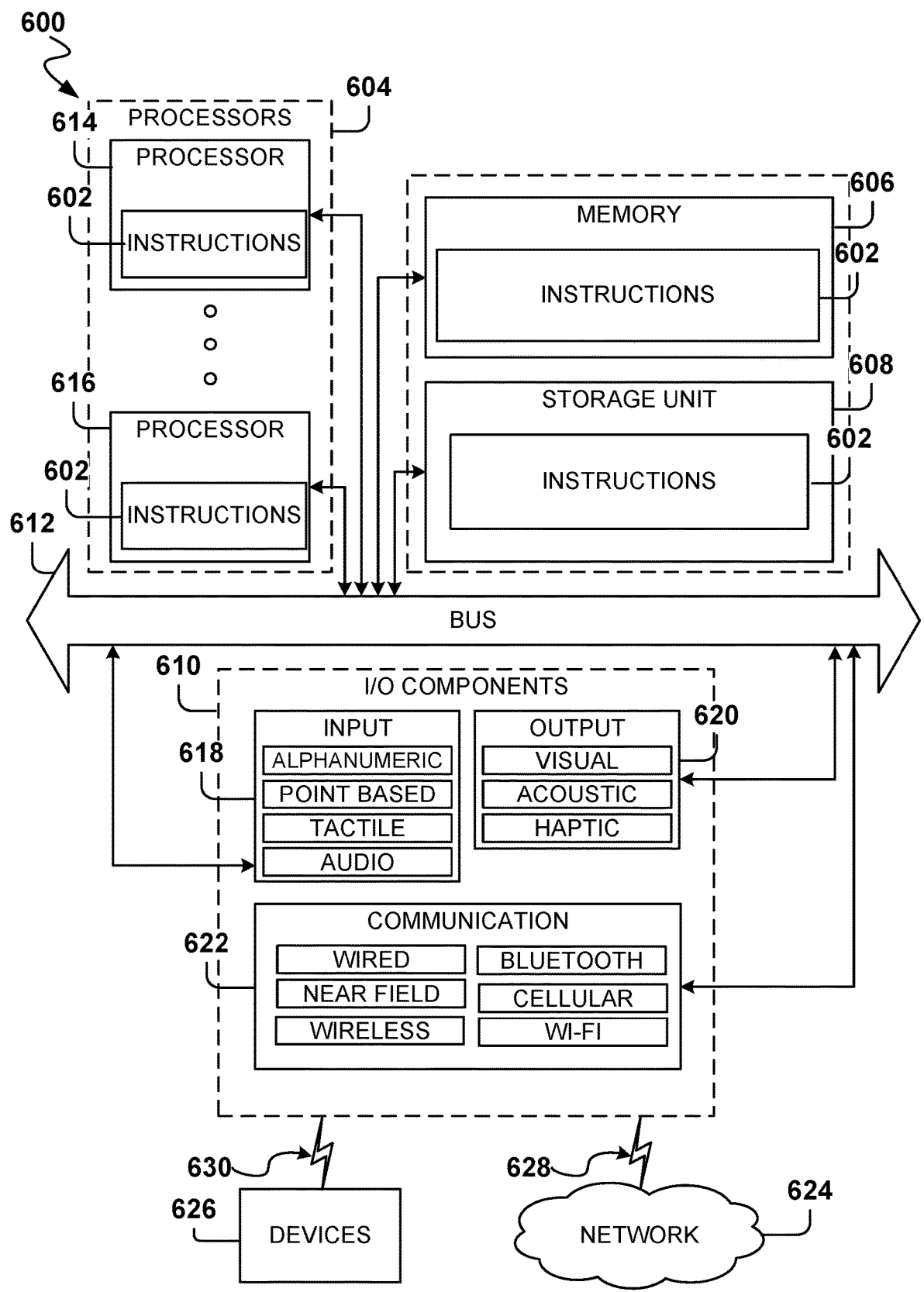
FIG. 6 is a block diagram illustrating components of an example machine that can use one or more embodiments discussed herein.

FIG. 6 is a block diagram illustrating components of an example machine 600 that can use one or more embodiments discussed herein. Specifically, FIG. 6 shows a diagrammatic representation of the machine 600 in the example form of a system, within which instructions 602 (e.g., software, a program, an application, an applet, an app, a driver, or other executable code) for causing the machine 600 to perform one or more operations that may make use of one or more of the methodologies discussed herein. For example, the instructions 602 include executable code that causes the machine 600 to execute one or more operations that cause a network layer device (e.g., MAC layer device) of the machine 600 (e.g., embodied by communication components 622) to perform the method 400. The machine 600 may be coupled (e.g., networked) to other machines.

By way of non-limiting example, the machine 600 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 602, sequentially or otherwise, that specify actions to be taken by the machine 600. Further, while only a single machine 600 is illustrated, the term "machine" shall also be taken to include a collection of machines 600 that individually or jointly execute the instructions 602.

The machine 600 may include processors 604, memory 606, a storage unit 608, and I/O components 610, which may be configured to communicate with each other such as via a bus 612. In some embodiments, the processors 604 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 614 and a processor 616 that may execute the instructions 602. The term "processor" is intended to include multi-core processors 604 that may comprise two or more independent processors (sometimes referred to as "cores") that may execute instructions 602 contemporaneously. Although FIG. 6 shows multiple processors 604, the machine 600 may include a single processor with a single core, a single processor with multiple cores (e.g., a multi-core processor), multiple processors with a single core, multiple processors with multiple cores, or any combination thereof.

The memory 606 (e.g., a main memory or other memory storage) and the storage unit 608 are both accessible to the processors 604 such as via the bus 612. The memory 606 and the storage unit 608 store the instructions 602. The instructions 602 may also reside, completely or partially, within the memory 606, within the storage unit 608, within at least one of the processors 604 (e.g., within the processor's cache memory), or any suitable combination thereof, during execution thereof by the machine 600. Accordingly, the memory 606, the storage unit 608, and the memory of the processors 604 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 602. The term "machine-readable medium" shall also be taken to include any medium, or combination of multiple media, that is capable of storing instructions (e.g., instructions 602) for execution by a machine (e.g., machine 600), such that the instructions, when executed by one or more processors of the machine (e.g., processors 604), cause the machine to perform one or more operations that makes use of one or more of the methodologies described herein (e.g., the method 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 610 may include a wide variety of components to receive input, provide output, produce output, transmit information, exchange information, capture measurements, and so on. The specific I/O components 610 that are included in a particular machine 600 will depend on the type of the machine 600. For example, portable machines such as mobile phones will likely include a touch input device or other such input mechanisms, while a headless server machine will likely not include such a touch input device. It will be appreciated that the I/O components 610 may include many other components that are not specifically shown in FIG. 6. The I/O components 610 are grouped according to functionality merely for simplifying the following discussion and the grouping is in no way limiting. In various embodiments, the I/O components 610 may include input components 618 and output components 620. The input components 618 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 610 may include communication components 622 operable to couple the machine 600 to a network 624 or devices 626 via a coupling 628 and a coupling 630 respectively. For example, the communication components 622 may include a network interface component or another suitable device to interface with the network 624. In further examples, the communication components 622 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 626 may be another machine or any of a wide variety of peripheral devices. According to various embodiments, the communication components 622 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a port manager comprising a set of input ports to receive data units from a transmitting network device, the port manager being configured to initiate reception of a data unit via a select port of the set of input ports, the data unit comprising a header portion and a non-header portion; and
an ingress processor configured to perform operations for cut-through forwarding, the operations comprising:
   initiating reception of the header portion of the data unit from the port manager;
   after the header portion has finished being received by the ingress processor from the port manager and prior to the port manager finishing reception of the data unit, initiating ingress processing of the header portion;
   detecting when the data unit has finished being received by the port manager;

detecting when the ingress processing of the header portion has finished, the ingress processing generating processed header data; and after both the data unit has finished being received by the port manager and the ingress processing of the header portion has finished:

determining whether an error was detected while the data unit was being received by the port manager, the port manager being configured to generate data unit length information for the data unit, the data unit length information being received by the ingress processor; and in response to determining that the error was not detected while the data unit was being received by the port manager, performing a set of subsequent operations based on the processed header data, the set of subsequent operations comprising a data-unit-length dependent operation that uses the data unit length information.

2. The system of claim 1, wherein the operations comprise:

accessing the data unit length information for the data unit.

3. The system of claim 1, comprising:

a data unit buffer configured to:

initiate reception of the data unit from the port manager; and send an indication to the ingress processor when the data unit buffer has finished receiving the data unit from the port manager, the indication indicating that the data unit has finished being received by the port manager.

4. The system of claim 3, wherein the port manager generates the data unit length information after the data unit buffer has finished receiving the data unit, the indication to the ingress processor comprising the data unit length information.

5. The system of claim 1, wherein the operations comprise:

accessing the data unit length information for the data unit.

6. The system of claim 1, wherein the operations comprise:

after the set of subsequent operations has completed performance, generating an acknowledgement indication that the data unit is ready for forwarding to another network device.

7. The system of claim 6, comprising:

a data unit buffer configured to:

initiate reception of the data unit from the port manager;

send a confirmation indication to the ingress processor when the data unit buffer has finished receiving the data unit from the port manager and storing the data unit on the data unit buffer, the confirmation indication indicating that the data unit has finished being received by the port manager; and after sending the confirmation indication to the ingress processor:

receive the acknowledgement indication from the ingress processor; and cause the data unit stored on the data unit buffer to be forwarded to the other network device.

8. The system of claim 7, wherein the data unit buffer causes the data unit stored on the data unit buffer to be forwarded to the other network device by sending the data unit to an egress processor, the system comprising:

the egress processor configured to receive the data unit from the data unit buffer for forwarding.

9. The system of claim 1, comprising:

a data unit buffer configured to:

receive the data unit from the port manager; and store the data unit on the data unit buffer; and the ingress processor configured to:

generate queue information based on at least one operation of the set of subsequent operations; and send the queue information to the data unit buffer, the data unit buffer being configured to queue the data unit in the data unit buffer based on the queue information.

10. The system of claim 1, wherein the processed header data comprises metadata.

11. The system of claim 1, wherein the header portion comprises a header byte string.

12. The system of claim 1, wherein the data unit comprises a data packet.

13. The system of claim 12, wherein the data packet is defined by an IEEE network standard.

14. The system of claim 1, comprising:

a data unit policer configured to monitor data rate of a data flow and enforce a per-flow bandwidth limit, the set of subsequent operations comprising an operation relating to the data unit policer.

15. The system of claim 1, wherein the set of subsequent operations comprising an operation based on a data unit counter.

16. The system of claim 1, wherein the set of subsequent operations comprising an operation that checks a length of the data unit.

17. A method comprising:

begin receiving, by a port manager of a first physical layer device, a data unit from a second physical layer device, the data unit comprising a header portion and a non-header portion;

after the header portion has finished being received by the port manager and prior to the port manager finishing reception of the data unit, initiating ingress processing of the header portion at the first physical layer device;

detecting when the data unit has finished being received by the port manager;

detecting when the ingress processing of the header portion has finished, the ingress processing generating processed header data; and after both the data unit has finished being received by the port manager and the ingress processing of the header portion has finished:

determining that an error was detected while the data unit was being received by the port manager, the port manager being configured to generate data unit length information for the data unit; and in response to determining that the error was not detected while the data unit was being received by the port manager, performing a set of subsequent operations based on the processed header data, the set of subsequent operations comprising a data-unit-length dependent operation that uses the data unit length information.

18. The method of claim 17, wherein the method comprises:

accessing the data unit length information for the data unit.

19. The method of claim 17, comprising:
after the set of subsequent operations has completed performance, forwarding the data unit to a third physical layer device.

20. A non-transitory computer-readable medium comprising instructions that, when executed by a hardware processor of a first physical layer device, cause the first physical layer device to perform operations comprising:
begin receiving, at a port manager of the first physical layer device, a data unit from a second physical layer device, the data unit comprising a header portion and a non-header portion;
after the header portion has finished being received by the port manager and prior to the port manager finishing reception of the data unit, initiating ingress processing of the header portion;
detecting when the data unit has finished being received by the port manager;
detecting when the ingress processing of the header portion has finished, the ingress processing generating processed header data; and
after both the data unit has finished being received by the port manager and the ingress processing of the header portion has finished:
determining whether an error was detected while the data unit was being received by the port manager, the port manager being configured to generate data unit length information for the data unit; and
in response to determining that the error was not detected while the data unit was being received by the port manager, performing a set of subsequent operations based on the processed header data, the set of subsequent operations comprising a data-unit-length dependent operation that uses the data unit length information.

* * * * *